April 23, 1940.    H. J. FINDLEY    2,198,156
AIR INTAKE DEVICE FOR VEHICLES
Filed Oct. 7, 1938    3 Sheets-Sheet 1

INVENTOR
HOWARD J. FINDLEY
John F. Stark
ATTORNEY

April 23, 1940. H. J. FINDLEY 2,198,156
AIR INTAKE DEVICE FOR VEHICLES
Filed Oct. 7, 1938 3 Sheets-Sheet 2

INVENTOR
HOWARD J. FINDLEY
John F. Stark
ATTORNEY

April 23, 1940.　　　　H. J. FINDLEY　　　　2,198,156
AIR INTAKE DEVICE FOR VEHICLES
Filed Oct. 7, 1938　　　　3 Sheets-Sheet 3

INVENTOR
HOWARD J. FINDLEY
John F. Stark
ATTORNEY

Patented Apr. 23, 1940

2,198,156

UNITED STATES PATENT OFFICE 2,198,156

AIR INTAKE DEVICE FOR VEHICLES

Howard J. Findley, Euclid, Ohio, assignor to Eaton Manufacturing Company, Cleveland, Ohio, a corporation of Ohio Application October 7, 1938, Serial No. 233,732

5 Claims. (Cl. 98—2)

This invention relates to a fresh air intake device for automotive vehicles, and more particularly to a device of this type embodying means for use in conjunction with the usual cowl ventilator whereby the delivery of fresh air therethrough can be readily controlled for passage into the passenger compartment or to a desired point thereof.

The primary object of my invention is to provide an adaptor device which can be readily applied to the usual cowl ventilator of existing vehicles and which includes valve means movable to different positions for controlling the air intake therethrough independently of the air intake through such cowl ventilator.

Another object of my invention is to provide an improved air intake means of the type having an air scoop, and a discharge connection leading therefrom, suitable for use in conjunction with an automotive vehicle cowl ventilator, which permits the normal operation and transfer of air through such cowl ventilator and that is movable simultaneously therewith, but the delivery of air through said air intake box is controlled independently thereof.

A further object of my invention is to provide an improved cowl ventilator having an intake opening, an apertured movable cover member overlying the opening, and an air intake box underlying the aperture and secured to said cover member, and the passage of air through said intake box controlled by a second movable cover member thereover independently and/or simultaneously with the air passage through the cowl cover member.

The above being among the objects of the present invention the same consists in certain novel combinations and arrangement of parts hereinafter described and particularly set out in the appended claims.

Figure 1:
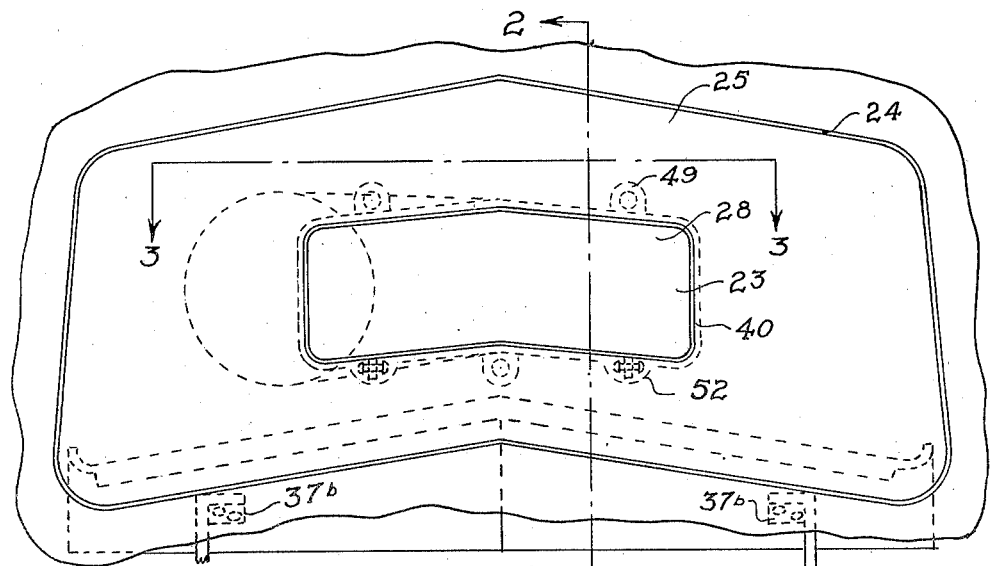
Figure 2:
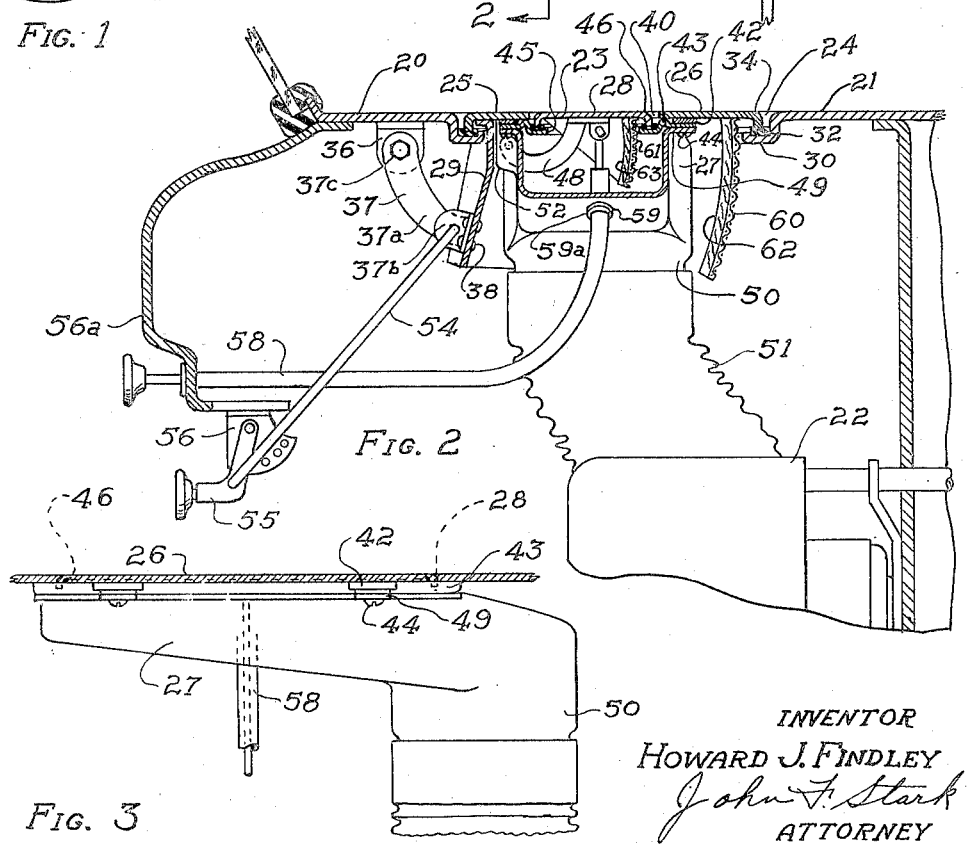
Figure 3:
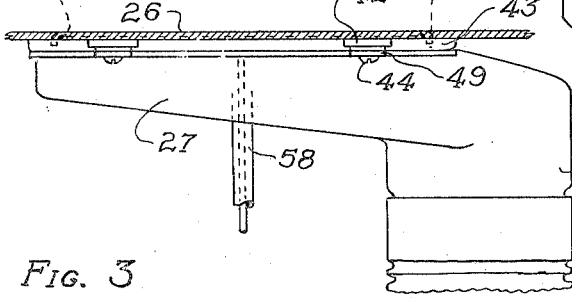
Figures 4, 5, 6:
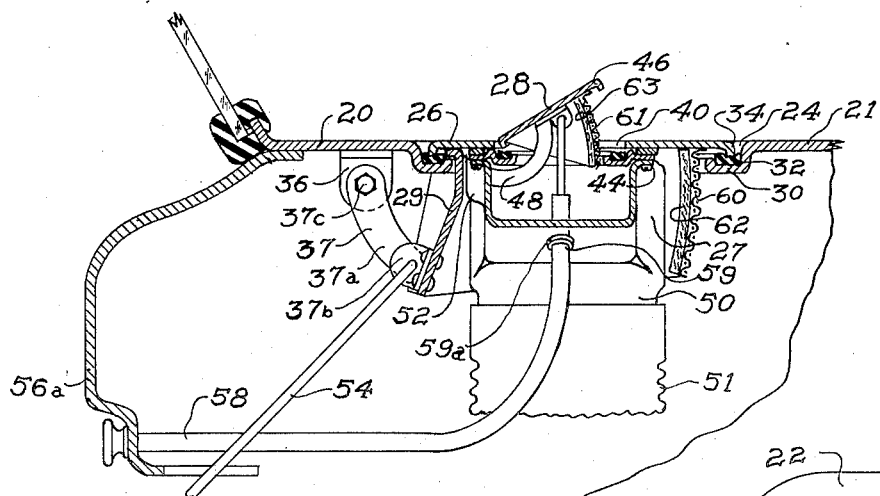

In the accompanying sheets of drawings,

Fig. 1 is a top plan view showing my improved air intake device embodied in a vehicle cowl ventilator; and Fig. 2 is a vertical sectional view taken through the cowl ventilator and adjacent vehicle structure as on the line 2—2 of Fig. 1; and Fig. 3 is a partial sectional view showing my improved air intake box secured to the cowl ventilator closure as on the line 3—3 of Fig. 1; and Fig. 4 is a partial vertical sectional view similar to that of Fig. 2, but showing the door within the ventilator lid in open position and serving to direct air into the box; and Fig. 5 is another partial vertical sectional view taken through the device and showing the cowl ventilator lid in lifted position, and the box supported therewith, to cause air to be delivered directly into the vehicle compartment; and Fig. 6 is a partial elevational view of the heater shown in Fig. 2 and a conduit connected thereto illustrating one means of draining any water taken into the air box before arriving at the heat-exchanger.

Figure 7:
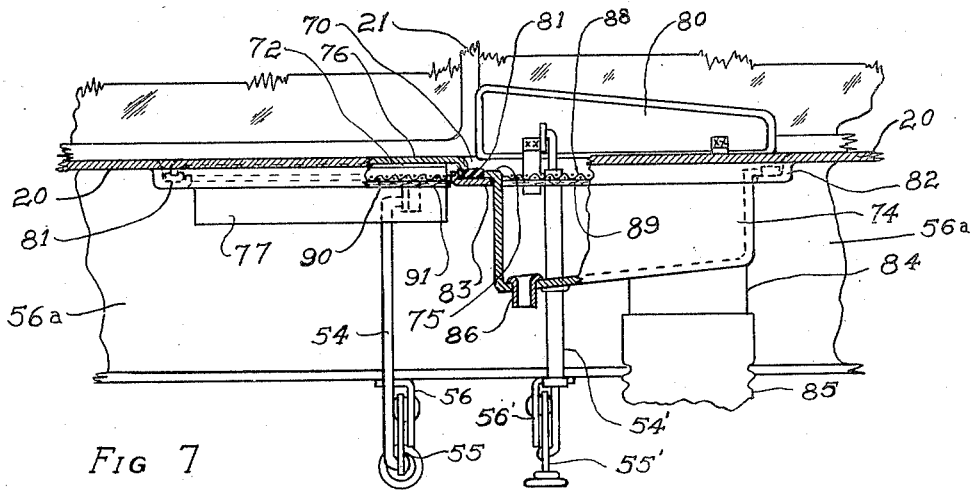
Figure 8:
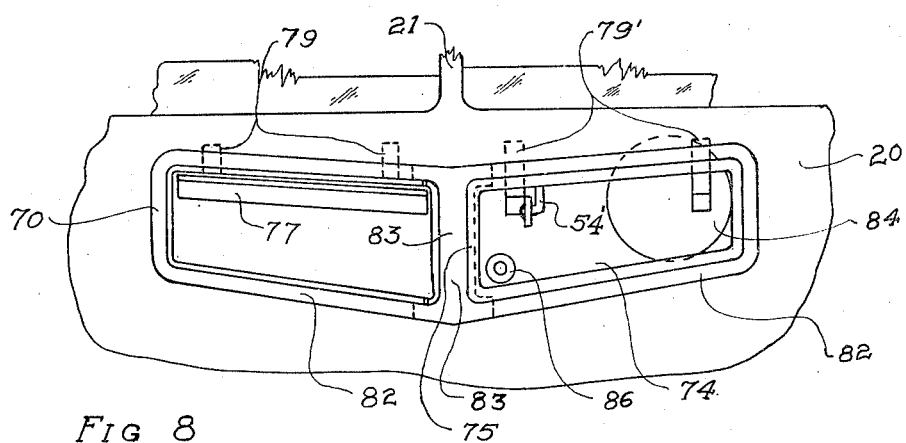
Figure 9:
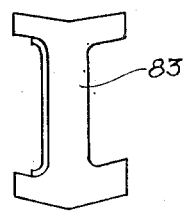

Fig. 7 is a transverse vertical sectional view through the cowl in front of the cowl ventilator and looking toward the windshield, showing another fresh air intake device of my invention; and Fig. 8 is a partial plan view of the structure shown in Fig. 7 illustrating the arrangement of the cowl ventilator with the closures therefor removed; and Fig. 9 is a detached plan view of the flanged channel member shown in Fig. 8.

Further and more detailed reference will now be made to the accompanying drawings for the purpose of describing my fresh air intake device. Figs. 1 and 2 of the drawings illustrate the principal embodiment of my fresh air intake device applied to the cowl 20 of the automobile 21. My fresh air intake device is especially suitable for use on vehicles which have an air heating, cooling, or conditioning device 22, in the passenger compartment thereof. The device 22 may be an air conditioning device of any satisfactory form which is adapted to heat, cool, or condition fresh air brought in from outside the vehicle and which may or may not recirculate or condition the air already in the vehicle compartment, or may be a device in which the conditioned air being delivered is partly fresh air and partly recirculated air.

The fresh air intake device 23 is associated with an opening 24 of the cowl 20, and may comprise a combined lid and deflector member 25 and an air intake box 27 supported thereby. Most of the automobiles being used at the present time, or now being manufactured are provided with a cowl opening corresponding with the opening 24 and a combined lid and deflector member corresponding with the member 25, and when my invention is to be applied to vehicles so equipped, I construct the box 27 as an accessory device which can be readily applied to existing structure. However, my invention is not limited in scope to an accessory device to be applied to existing vehicles because an air intake box in combination with a lid and deflector member, as herein disclosed, can also be incorporated in vehicles as a part of their original construction and equipment, and in one phase of my invention I contemplate having the extra lid and deflector member, within the usual cowl ventilator closure, supplied as original equipment.

The cowl opening 24 may have any desired shape or outline, such as the laterally elongated somewhat rectangular shape shown in Fig. 1. The member 25 may comprise a lid portion 26 which is disposed above or outwardly of the cowl opening 24 and a deflector portion 29 which supports the lid portion and extends into the cowl opening. Both the lid and deflector portions may be formed as sheet metal stampings and may be laterally elongated to correspond with the lateral elongation of the cowl opening 24. The deflector portion 29 preferably extends in angular relation to the lid portion 26 so that when the lid is elevated above the cowl, the lid and deflector portions form an air scoop which, during forward motion of the vehicle, causes a stream of fresh air to be directed or delivered downwardly into the vehicle through the opening 24. The foregoing description of the construction and arrangement of the member 23 is more or less typical although in different makes of vehicles, similar members of specifically different shapes and construction may be encountered.

The portion of the cowl surrounding the opening 24 may be deflected to form a channel or rim 30 in which is seated a resilient gasket 32 formed of sponge rubber or other suitable material. The lid portion 26 may be provided around its outer edge with an inturned flange 34 adapted to engage the gasket 32 when the lid is in its closed or lowered position, that is to say, in a position with its top substantially flush with the top of the cowl.

As is usual in present day vehicle body construction, the member or scoop 25 may be mounted for swinging movement whereby this member can be moved to the desired different positions relative to the cowl opening 24. For this purpose a pair of laterally spaced brackets 36 may be mounted on the underside of the cowl 20 and correspondingly spaced arms 37 may be connected to the deflector portion 29 and hinged to the brackets. To facilitate the mounting of the member 25 on the vehicle body and the construction of the hinge for this member, it is usual practice to construct the hinge arms 37 of two sections 37a and 37b which are pinned together by hinge pins, hereinafter described, when the member is installed in the cowl opening. The arm sections 37b may be secured to the deflector portion 29 by means of rivets 38 and are provided with a suitable opening or connection for an actuating lever as will be presently explained. The arm sections 37a are pivotally secured to the brackets 36 by bolts 37c.

Within the marginal edges of the lid portion 26 is a laterally elongated opening 40 corresponding somewhat in shape, but about one-quarter the area of the cowl opening 24. This opening forms the setting for the fresh air intake device 23 which is separate and distinct from the air inflow through the cowl opening 24. In many respects the structure for controlling the admission of fresh air to the intake device 23 is similar to the member 25, that is to say, means similar to that already described must be duplicated. In this connection, around the inner periphery of opening 40 are spaced a suitable number of supports 42, which may be spot welded, riveted or otherwise fastened to the underside of lid portion 26, and which are provided preferably with threaded openings. The particular method of securing these supports will depend upon whether they are placed there by the vehicle manufacturer or whether they are secured in position when the device is applied as an accessory. That is to say, if the manufacturer supplies them they probably will be spot welded in place so that there is no evidence of them on the top of the lid member 26, while if they are applied as an accessory they may be riveted or bolted in place and a bezel or plated escutcheon ring applied thereover to mask the heads of the supporting means. In this instance the supports 42 are shown as spot welded to the underside of the lid portion 26 and an inner escutcheon ring 43 secured to the threaded opening therein by bolts 44. This escutcheon ring has an inwardly and upwardly turned flange 45 for reception of a sponge rubber gasket similar to flange 30 and sponge rubber gasket 32 of the cowl opening.

The cover member 28 has an inturned flange 46 adapted to seat in the flange 45 and gasket therein when in its closed or lowered position. The cover 28 is arranged for hinged movement by a pair of laterally spaced arms and brackets 48 which may be similar to the type previously described for moving the lid 26. In the open position the cover 28 acts as an air scoop, which during forward motion of the vehicle, causes a stream of fresh air to be directed or delivered downwardly into the box 27 and thence to the heater 22, as best shown in Figs. 2 and 4.

The air intake box 27 may comprise a hollow sheet metal structure formed of one or more stampings, or may be of any other suitable construction. This box is laterally elongated to correspond with the opening 40 of the lid member 26, and as here shown has a main opening at the top provided with suitably spaced outwardly projecting lateral lugs 49 by which the box may be removably secured under the heads of bolts 44 in sealed relationship to the escutcheon ring 43. As shown in Figs. 2 and 3 the box 27 has side, end and bottom walls defining a recess or chamber similar to a shroud for collection of air, and one of the walls, preferably the bottom wall, has a discharge connection 50 leading from the box and with which a flexible conduit 51 may be connected for conducting fresh air to the heater 22 or other desired point of the vehicle. The box can be secured to the lid member 26 from a position above the cowl opening 24 by moving the lid to its fully opened position, disconnecting the bolts 44, placing the intake box in aligned position under the aperture 40 and replacing the bolts in the threaded holes in the escutcheon ring with the fastening lugs of the intake box therebetween. Laterally spaced recesses 52 provided in the rear wall of the box accommodate the hinge members 48 in sealed relation within the box so that no air may escape to the passager compartment as would be the case if the hinge members projected through the box wall.

For moving the combined lid and deflector portion 25 to different positions to thereby control the intake of fresh air through the cowl opening 24, the usual form of actuating means under control of the operator, as originally supplied with the vehicle, is retained and used in exactly the same manner as prior to the installation of the intake box in the lid portion. In the arrangement of Fig. 2, I employ a resiliently flexible rod or link 54 capable of transmitting pushing and pulling forces and having one end thereof connected with an actuating lever 55 and its other end disposed in the apertured hinge part 37b fulfilling the function of a hinge pin and for transmitting force to the lid member as previously mentioned. The lever 55 may be pivoted to a bracket or quadrant 56 which is mounted on the instrument panel 56a. It will be seen that a pushing force applied to the lever will be transmitted through the rod 54 and will apply a lifting force to the lid member 26 which also carries the complete air intake box 23 therewith, thereby admitting air directly to the passenger compartment.

Movement may be imparted to the lid 28 of the intake box 23, to thereby control the intake of fresh air into the box 27, by a Bowden wire 58 having one end connected to a bracket preferably spot welded to the underside of lid 28 and its other end operably secured in the instrument panel 56a convenient to the operator. A hole 59 provided in the bottom of the box 27 accommodates the Bowden wire 58 and a hollow collar 59a secured to the box provides an anchorage and frictional fit for the wire so that no leakage of air out of the box results at this point. It will be clear now that a novel means for admitting separate and distinct streams of fresh air through the usual cowl ventilator, without substantially impairing its original efficiency, and separate means for individually controlling the inflow of air therethrough, has been described.

When the operator wishes to supply fresh air to the heat-exchanger 22, he pushes the knob on the end of the Bowden wire 58 and thereby causes the lid member 28 to be swung open to the position shown in Fig. 4. With the lid member in this position it will act as an air scoop during forward motion of the vehicle and will cause air to be deflected downwardly into the box. Since the cowl lid 26 is seated against the gasket 32, air will not pass directly into the vehicle compartment, but will be forced into the box and thence through the discharge connection 50 and flexible conduit to the heater 22.

If the operator does not desire heated fresh air, but wishes to admit fresh air directly into the vehicle compartment, he imparts a pushing movement to the lever 55 and thereby causes the cowl lid member 26 to be swung open to the position shown in Fig. 5. By this actuation of only lever 55 the box 27 is lifted with cowl lid 26, and since lid member 28 remains closed no air will be admitted to the box. With the lid members and box in the relative positions shown in Fig. 5 the lid 26 and deflector 29 will act as an air scoop during forward motion and will cause air to be deflected downwardly directly into the vehicle. When the closed box is in this elevated position its forward wall is obviously spaced from the forward edge of the cowl opening 24 and due to its relative area does not materially affect the inflow of air through such cowl opening. At this time the forward wall of the box 27 lying in front of the deflector 29 also cooperates with the lid member 26 in forming a scoop or deflecting member which causes fresh air to be forced downwardly through the opening 24 directly to the vehicle compartment during forward vehicle movement.

During certain weather conditions the operator may not wish to cut off the entire supply of fresh air to the heat-exchanger, but may prefer to have a portion of the fresh air delivered through the heat-exchanger and the remainder delivered directly into the vehicle compartment. To secure this effect he pushes the lever 55 only far enough to lift the lid 26 to any desired intermediate position. Then by a separate operation the operator pushes the Bowden wire control 58 to any desired position to lift the lid 28 so that some of the air will be forced into the box 27 and through the conduit to the heater. At the same time, fresh air will be forced directly into the vehicle compartment through the cowl opening 24.

To prevent insects and other foreign particles from entering the cowl ventilator, or the intake box, with the fresh air supply I provide separate screens 60 and 61 respectively, which are mounted on the forward portion of the cowl closures 26 and 28 to extend downwardly therefrom, respectively. In addition to the screens, filtering elements 62 and 63 may be provided for removing dust and other smaller foreign particles from the intake air. These filtering elements 62 and 63 may be in the form of a layer or bat of fibrous material which are disposed respectively against the screens 60 and 61 by any suitable stapling means.

During some conditions, rain may enter the box 27 with the fresh air supply, and to prevent the accumulated moisture from being transferred to the heat-exchanger 22 where serious damage might occur, I preferably provide a suitable drain connection 65 at some appropriate point of the discharge connection leading from the box, for example, the air intake elbow 22a adjacent the heater 22. This location is selected rather than the bottom wall of the box because in certain vehicles a radio and/or heater may be mounted on the dash in such a position that the discharge tube and/or drain connection would strike the same if they were extended downward from a central location below the aperture 40 above the air intake box. This is particularly true of heating or cooling units, that are frequently mounted in the center of the dash, measured transversely from side to side of the vehicle, so that a more even distribution of the conditioned air may be obtained. Since the cowl opening 24 is conventionally formed centrally of the dash for the same reason, to avoid this interference the discharge connection 50 thereunder is placed off to one side or the other of the bottom wall of the air box 27 and the drain connection moved to a suitable point in the discharge connection adjacent the heater as shown in Fig. 6.

In the construction illustrated in Figs. 7 and 8, I have shown a modified way of utilizing the present cowl ventilator for separately effecting an inflow of fresh air directly to the vehicle compartment or to an intake box for delivery to an air conditioning device. This construction shows a cowl 20, of the automobile 21, and a cowl opening 70 therein partially covered by a connected lid and deflector member 72 for controlling the intake of fresh air therethrough. The remaining portion of the cowl opening is used for reception of an intake box 74 which co-operates with this portion of the cowl opening 70 for the intake of fresh air thereinto. The connected lid and deflector member 72 may comprise a lid portion 76 and a deflector portion 77 and may be mounted for swinging movement in a pair of laterally spaced cowl brackets by means of a pair of correspondingly spaced hinge arms 79, similar in construction to the hinge arms 37 and co-operating structure previously described. The deflector 77 also has an actuating rod 54 attached thereto at one end and the other end of the rod secured to actuating lever 55 and bracket 56. The bracket 56 is secured to the underside of instrument panel 56a, all as previously described in Fig. 2 for effecting swinging movement of the cowl ventilator lid and deflector proper. For controlling the intake of fresh air through the intake box 74 a lid member 80 may be used, and substantially covers the remaining portion of the cowl opening 70. The lid member 80 is mounted for swinging movement by a second pair of laterally spaced cowl brackets and correspondingly spaced hinge arms 79', all as previously described for lid 76. The actuating mechanism for lid member 80, comprising rod 54', actuating lever 55' and bracket or quadrant 56', is a substantial duplicate of the members 54, 55 and 56 above described.

The box 74 is generally similar to the box 27 previously described in that it is of sheet metal construction having side, end and bottom walls and an opening at the top thereof corresponding substantially in size and shape with one-half, or one wing of, the laterally elongated opening 70 of the cowl. This box has an outwardly projecting lateral flange or rim 75 adapted to seat in a rubber gasket 81 disposed in an inwardly and upwardly turned flange 82 of the cowl opening 70. The inner side of the box 74 extends laterally across a medial line of opening 70 and is supported by an inserted channel member 83 similar to and carried by flange 82, as shown in Fig. 9. The lid members 76 and 80 are also provided with peripheral inturned flanges adapted to seat in the flanges 82 and 83 when in the lowered or closed position so as to completely seal the opening 70 against admission of wind or moisture. The box 74 also has a discharge connection 84 extending therefrom preferably through the bottom wall, with which a flexible conduit 85 may be connected for supplying fresh air to a heater in the passenger compartment of the vehicle. This box has a drain connection 86, also in the bottom wall thereof, and at the lowest portion of the sloping bottom wall so that accumulated moisture will gravitate thereto. However, instead of or in addition to employing a drain connection leading from the box as shown in Fig. 8, I may provide a drain connection at some point in the discharge connection leading from the box as shown in Fig. 6.

This form of fresh air intake device may also be provided with screen and filter elements 88 and 89 of a construction similar to that above described but which are arranged to extend across the box opening with the edges of the screen connected to the inner side of the rim 75. That portion of the cowl opening 70 communicating directly with the interior of the vehicle and normally covered by the lid member 76 is likewise provided with screen and filter elements 90 and 91 as just described and arranged to extend across this portion of the cowl opening with the edges of the screen connected to the inner side of the rim 82 of the cowl opening and channel member 83. A laterally elongated slit, not shown, may be provided in the screen and filter elements 90 and 91 for accommodation of the deflector portion 77 of the lid member.

When fresh air is to be supplied through the conduit 85 to the heat-exchanger, the operator pushes on actuating lever 55' to thereby cause a lifting force to be transmitted through flexible rod 54' to the lid member 80. If the operator wishes to admit fresh air directly to the vehicle compartment without passage through the heat-exchanger, he operates only the lever 55, leaving the lever 55' in the closed position. In this position the connected lid and deflector member 72 are in an open or partially opened position and the lid portion 76 and deflector portion 77 serves as an air scoop for deflecting air through this portion of the cowl opening 70. Likewise, for certain weather conditions, it may be desirable to have the lid 76 open a fraction of the amount lid 80 is opened, or any desired proportional relationship between the two lid members dependent upon the amount of tempering or conditioning of the air desired in the vehicle compartment. When this condition is preferred, since the lid members 76 and 80 are operated independently of each other, they may be adjusted to any desired relationship.

From the foregoing description and accompanying drawings, it will now be seen that I have devised an improved fresh air intake device which can be embodied in the original vehicle construction, or which can be supplied as an adaptor to the cowl ventilators of existing vehicles. Furthermore, my improved fresh air intake device provides for the control of the intake of fresh air separately and individually, by the movement of distinct lid members to different positions relative to the cowl opening, to supply fresh air through an intake box and conduit to a heating or cooling unit, or to supply fresh air directly into the vehicle compartment.

While I have illustrated and described the air intake means of my invention in a rather detailed manner, it will be understood that I do not wish to be limited to the particular forms of my invention and constructional details herein disclosed but regard my invention as including such changes and modifications from the formal aspects thereof as do not constitute a departure from the spirit of the broad invention as defined in the appended claims.

What I claim is:

1. In an automobile having a cowl opening and an apertured movable lid therefor, hinge means mounting said lid on the cowl, a heat-exchanger, and an air intake box secured to the underside of said lid member having an opening adapted to register substantially with the apertured lid and a connection leading to the heat-exchanger, said box being movable with said lid member and including a second movable cover member therefor hingedly mounted on said lid and overlying said aperture therein for controlling independently the delivery of fresh air into the automobile and to the heat-exchanger through said connection, and manual means to operate said lid and cover member.

2. In combination with a vehicle cowl having an opening and an apertured movable lid therefor providing an air scoop adjacent thereto, hinge means mounting said lid on the cowl, an air intake box open at the top thereof and having a discharge conduit leading therefrom secured to the underside of said apertured lid member and movable therewith, a second movable lid member for said aperture hingedly mounted on said lid and overlying said aperture therein, and separate manually operable means providing for movement of said cowl lid and said second lid member for controlling independently the inflow of air through the cowl opening and through said conduit in response to forward motion of the vehicle.

3. In a structure of the character described, a cowl having an opening therein, a movable lid member therefor having an air intake opening therein, hinge means mounting said lid on the cowl, a box having a discharge connection leading therefrom and a top opening thereinto, said box being fixedly mounted in position with the rim of its top engaging the rim of the opening in said cowl lid member, a second movable lid member hingedly mounted on said first lid member, separate manually operable means to effect movement of said lid members, and said movable lid members adapted when in one position to form a closure for the cowl opening and the box opening, respectively, and when in another position to form a deflector for directing air into the cowl opening and the box opening, respectively.

4. An adaptor device to be applied to a cowl ventilator having an apertured movable lid member hinged thereto, comprising a box having a discharge connection leading therefrom, said box being open at the top thereof and adapted for removable mounting under the apertured lid member, and means constituting a cover member hinged to the lid member and overlying the aperture in the cowl ventilator lid member providing for movement thereof to different positions relative to said lid member for controlling the air intake through said box member independently of the air intake through the cowl ventilator.

5. In a structure of the character described, a cowl having an air intake opening, means controlling the intake of air through said opening comprising a movable apertured lid member secured to said cowl and overlying the opening, a box movable with and fixed to the underside of said lid member, a second movable lid member pivotally secured to said first lid member and overlying the aperture therein, and separate and distinct means for imparting movement to said lid members for positioning the same relative to their respective openings.

HOWARD J. FINDLEY.